United States Patent
Shin et al.

(10) Patent No.: US 9,762,697 B2
(45) Date of Patent: Sep. 12, 2017

(54) METHOD AND SYSTEM FOR SHARING CONTENT BY USING POSITION INFORMATION AND CONTENT ACCESS HISTORY

(71) Applicant: Samsung Electronics Co., Ltd, Gyeonggi-do (KR)

(72) Inventors: In-young Shin, Gyeonggi-do (KR); Ji-hyeok Kim, Incheon (KR); Woo-jin Park, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 270 days.

(21) Appl. No.: 13/711,402

(22) Filed: Dec. 11, 2012

(65) Prior Publication Data

US 2013/0151593 A1    Jun. 13, 2013

(30) Foreign Application Priority Data

Dec. 12, 2011  (KR) .................. 10-2011-0133057

(51) Int. Cl.
*G06F 15/16*    (2006.01)
*H04L 29/06*    (2006.01)
(Continued)

(52) U.S. Cl.
CPC ............. *H04L 67/42* (2013.01); *G06Q 30/02* (2013.01); *H04L 67/18* (2013.01); *H04L 67/20* (2013.01);
(Continued)

(58) Field of Classification Search
CPC ....... H04L 67/18; H04L 67/22; H04L 67/306; H04L 67/20; H04L 67/26; H04L 67/42;
(Continued)

(56) References Cited

U.S. PATENT DOCUMENTS

| 8,037,040 B2 | 10/2011 | Vemuri et al. |
| 2004/0059498 A1* | 3/2004 | Chinomi ............ G01C 21/3682 701/516 |

(Continued)

FOREIGN PATENT DOCUMENTS

| JP | 2009-140010 | 6/2009 |
| JP | 2009-146066 | 7/2009 |
| KR | 10-2010-0107495 | 10/2010 |

OTHER PUBLICATIONS

International Search Report dated Feb. 27, 2013 in connection with International Patent Application No. PCT/KR2012/010283, 3 pages.

(Continued)

*Primary Examiner* — Lance L Barry

(57) ABSTRACT

A method and system for sharing content by using context information. A content recommendation server for recommending content to a device includes a context information receiving unit configured to receive position information of a first device from the first device. The server also includes a content registering unit configured to receive a request for registration of content from the first device and register the content together with the received position information. The server further includes a content recommendation unit configured to recommend the registered content to a second device in response to determining that the second device is within a region associated with the received position information of the first device. The region is allocated to the first device and a size of the region is determined based on a number of times that the registered content is provided to another device.

21 Claims, 9 Drawing Sheets

(51) Int. Cl.

| | | |
|---|---|---|
| *H04L 29/08* | (2006.01) | |
| *H04N 21/258* | (2011.01) | |
| *H04N 21/422* | (2011.01) | |
| *H04N 21/658* | (2011.01) | |
| *H04W 4/02* | (2009.01) | |
| *H04N 21/25* | (2011.01) | |
| *H04N 21/482* | (2011.01) | |
| *G06Q 30/02* | (2012.01) | |

(52) U.S. Cl.
CPC ........... *H04L 67/26* (2013.01); *H04N 21/251* (2013.01); *H04N 21/25841* (2013.01); *H04N 21/25891* (2013.01); *H04N 21/42202* (2013.01); *H04N 21/4826* (2013.01); *H04N 21/6582* (2013.01); *H04W 4/02* (2013.01)

(58) Field of Classification Search
CPC ........... G06Q 30/0261; G06Q 30/0255; G06Q 30/0252; G06Q 30/0269; G06Q 30/0272; G06Q 30/02; G06Q 30/3087; G06F 17/3087; H04N 21/251; H04N 21/25841; H04N 21/25891; H04N 21/42202; H04N 21/4826; H04N 21/6582; H04W 4/02
See application file for complete search history.

(56) References Cited

U.S. PATENT DOCUMENTS

| | | | |
|---|---|---|---|
| 2007/0078851 A1* | 4/2007 | Grell | ................ G06F 17/30657 |
| 2009/0144225 A1 | 6/2009 | Saito et al. | |
| 2009/0156182 A1 | 6/2009 | Jenkins et al. | |
| 2009/0164516 A1 | 6/2009 | Svendsen et al. | |
| 2009/0177744 A1 | 7/2009 | Marlow et al. | |
| 2010/0030465 A1* | 2/2010 | Solkesz | ................. G01C 21/20 |
| | | | 701/533 |
| 2010/0036830 A1 | 2/2010 | Lee | |
| 2010/0036831 A1 | 2/2010 | Vemuri et al. | |
| 2010/0138416 A1* | 6/2010 | Bellotti | ............ G06F 17/30056 |
| | | | 707/736 |
| 2010/0317370 A1* | 12/2010 | Feng | ...................... H04W 4/02 |
| | | | 455/456.3 |
| 2011/0137902 A1* | 6/2011 | Wable | ............... G06F 17/30867 |
| | | | 707/737 |
| 2012/0166433 A1* | 6/2012 | Tseng | ................ G06Q 30/0224 |
| | | | 707/728 |
| 2013/0073622 A1* | 3/2013 | Nguyen | ........... H04N 21/23103 |
| | | | 709/204 |
| 2013/0073686 A1* | 3/2013 | Sandholm | .......... G06Q 30/0631 |
| | | | 709/219 |
| 2013/0132477 A1* | 5/2013 | Bosworth | .............. G06Q 50/01 |
| | | | 709/204 |
| 2013/0151593 A1* | 6/2013 | Shin et al. | .................... 709/203 |

OTHER PUBLICATIONS

Written Opinion of International Searching Authority dated Feb. 27, 2013 in connection with International Patent Application No. PCT/KR2012/010283, 4 pages.

Extended European Search Report dated Jul. 10, 2015 in connection with European Patent Application No. 12857011.6; 8 pages.

* cited by examiner

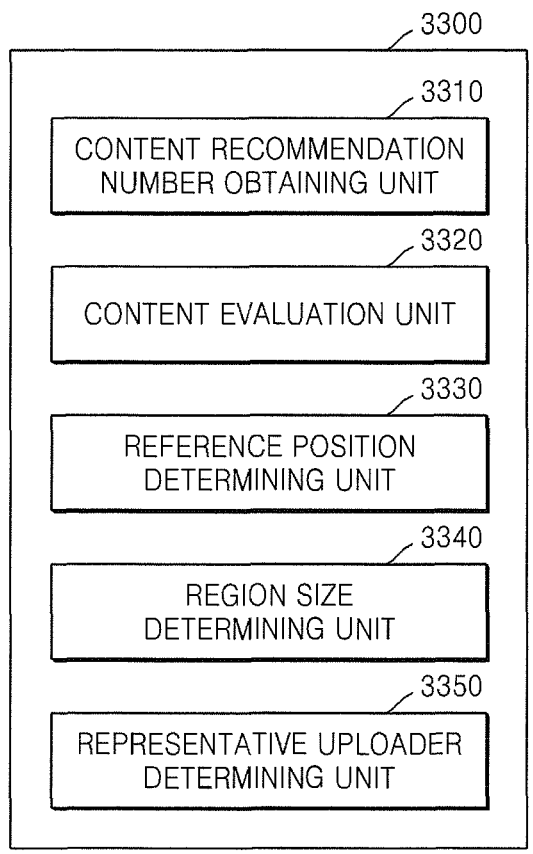
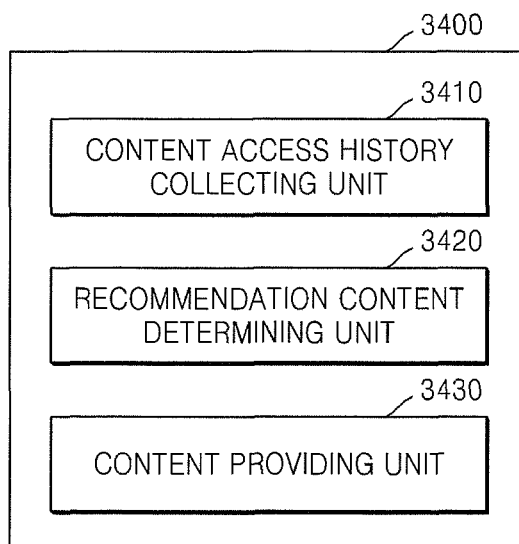

FIG. 9

| USER /70 | CONTENT /71 | GENRE /72 | POSITION /73 | DATE /74 | TIME /75 | WEATHER /76 | PROVIDING NUMBER /77 | EVALUATION /78 |
|---|---|---|---|---|---|---|---|---|
| AAA | Aaa.mp3 | Ballad | GWANGHWAMUN | 2011.11.01 | 6:00 | FINE | 8 | 6 |
| | Aab.mpg | Dance | GWANGHWAMUN | 2011.11.02 | 17:00 | CLOUDY | 7 | 4 |
| | Aac.mp3 | Ballad | GANGNAM STATION | 2011.11.03 | 20:00 | RAIN | 5 | 2 |
| AAB | Baa.mp3 | Rock | GANGNAM STATION | 2011.11.28 | 17:00 | FINE | 15 | 3 |
| | Bab.mp3 | Rock | GANGNAM STATION | 2011.11.29 | 22:00 | FINE | 20 | 9 |
| ... | ... | ... | ... | ... | ... | ... | ... | ... |

FIG. 10

| USER / 80 | REFERENCE POSITION / 81 | REGION SIZE / 82 | CONTENT / 83 |
|---|---|---|---|
| AAA | GWANGHWAMUN | 500m | Aaa.mp3, Aab.mpg, ... |
| AAB | GANGNAM STATION | 700m | Baa.mp3, Bab.mp3, ... |
| ... | ... | ... | ... |

FIG. 11

| USER | POSITION | CONTENT | GENRE | DATE | TIME | WEATHER | EVALUATION |
|---|---|---|---|---|---|---|---|
| BBB | GWANGHWAMUN | bbb.mp3 | Ballad | 2011.09.01 | 7:00 | FINE | 9 |
| | GWANGHWAMUN | bbc.mpg | Ballad | 2011.09.22 | 17:00 | CLOUDY | 7 |
| | GANGNAM STATION | bbd.mp3 | Rock | 2011.10.11 | 20:00 | RAIN | 2 |
| BBC | GANGNAM STATION | ccc.mp3 | Rock | 2011.10.01 | 17:00 | FINE | 8 |
| | GANGNAM STATION | ccd.mp3 | Ballad | 2011.10.03 | 22:00 | FINE | 3 |
| ... | ... | ... | ... | ... | ... | ... | ... |

METHOD AND SYSTEM FOR SHARING CONTENT BY USING POSITION INFORMATION AND CONTENT ACCESS HISTORY

CROSS-REFERENCE TO RELATED APPLICATION(S) AND CLAIM OF PRIORITY

The present application is related to and claims the benefit of Korean Patent Application No. 10-2011-0133057, filed on Dec. 12, 2011, in the Korean Intellectual Property Office, the disclosure of which is incorporated herein in its entirety by reference.

TECHNICAL FIELD OF THE INVENTION

The present disclosure relates to a method and system for sharing content by using context information, and more particularly, to a content sharing system that recommends content according to a position and situation of a device and a method of sharing content.

BACKGROUND OF THE INVENTION

Recently, databases (DBs) of digital contents have gradually increased in quantity and size and accordingly, demand for a content sharing system for effectively searching for contents and providing a recommendation service has increased. In a content sharing system, a user wants to share contents with another user and, in particular, wants to receive content suitable for a position and situation of the user from among various types of contents that are uploaded by another user. In addition, a server for providing content recommendation services needs to allow a user to actively register and use contents in order to activate services.

SUMMARY OF THE INVENTION

To address the above-discussed deficiencies of the prior art, it is a primary object to provide a method and system for sharing content by using context information, by which content is shared between devices by using context information about the content.

The present disclosure also provides a method and system for sharing content by using context information, by which registered content is effectively recommended based on a position and content access history of a device.

The present disclosure also provides a method and system for sharing content by using context information, by which content is recommended to another device that is positioned in a region corresponding to the device, based on the region.

According to an aspect of the present disclosure, there is provided a content recommendation server for recommending content to a device. The content recommendation server includes a context information receiving unit configured to receive position information of a first device from the first device, a content registering unit configured to receive a request for registration of content from the first device and register the content together with the received position information, and a content recommendation unit configured to recommend the registered content to a second device, based on the received position information and a content access history of the second device.

The content recommendation server may further include a region determining unit configured to determine a region corresponding to the first device, based on an evaluation of the registered content, wherein the content recommendation unit provides the registered content to the second device that is positioned in the determined region.

The region determining unit may determine the region corresponding to the first device, based on the received position information.

The region determining unit may determine the region, based on a landmark within a predetermined range from a position where the first device requests registration of the content.

The region determining unit may determine a size of the region, based on the evaluation of the registered content.

The content recommendation unit may determine content to be recommended to the second device, based on information about at least one of a time and date when the content is registered, and weather of a place where the first device providing the content is positioned.

The context information receiving unit may receive user information of the first device and user information of the second device, and the content recommendation unit may determine content to be provided to the second device, based on the user information of the first device and the user information of the second device.

The user information may include information about at least one of a sex, age, and field of interest of a user.

The registered content may be evaluated based on at least one of a number of times that the registered content is provided to another device, and the evaluation of the registered content, which is input from the device.

The content registration unit may receive an identification value of content from the first device and register content corresponding to the identification value.

The content access history of the second device may include at least one of a type of content provided from the content recommendation server to the second device, a date when content is provided, a position where content is provided, weather at the position, and an evaluation of content by the second device.

According to another aspect of the present disclosure, there is provided a device requesting registration of shared content. The device includes a context information collecting unit configured to collect position information of the device, a content reproducing unit configured to reproduce content, and a content registration requesting unit configured to request a server to register the reproduced content. The content registration requesting unit provides the collected position information to the server, the reproduced content is registered to the server according to the request to register the content, and the registered content is provided to another, based on the provided position information and a content access history of the other device.

A region of the device may be determined based on the collected position information and an evaluation of the content that is registered to the server.

The registered content may be provided to the other device positioned in the region, based on the determined region.

A content access history of the other device may include at least one of a type of content provided from the server to the other device, a date and time when the content is provided, a position where the content is provided, weather of the position, and an evaluation of the content by the other device.

According to another aspect of the present disclosure, there is provided a device for receiving shared content, the device including a position information providing unit configured to provide position information of the device to a server, and a content receiving unit configured to receive content corresponding to the position from the server. The content receiving unit receives content that is recommended based on the provided position information and a content access history of the device.

The device may further include a content evaluation unit configured to provide evaluation information of the received content to the server, wherein a region of another device providing the content may be determined based on an evaluation of the content, and the content receiving unit may receive content that is registered by the other device from the server when a position of the device is included in the region.

According to another aspect of the present disclosure, there is provided a method of recommending content to a device. The method includes receiving position information of a first device from the first device, receiving a request for registration of content from the first device and registering the content together with the received position information, and recommending the registered content to a second device, based on the received position information and a content access history of the second device.

The method may further include determining a region corresponding to the first device, based on an evaluation of the registered content, wherein the recommending of the registered content may include providing the registered content to the second device that is positioned in the determined region.

The determining of the region may include determining the region corresponding to the first device, based on the received position information.

The determining of the region may include determining the region based on a landmark within a predetermined range from a position where the first device requests registration of the content.

The determining of the region may include determining a size of the region, based on the evaluation of the registered content.

The recommending of the registered content may include determining content to be recommended to the second device based on information about at least one of a time and date when the content is registered, and weather of a place where the first device providing the content is positioned.

The method may further include receiving user information of the first device and user information of the second device, wherein the recommending of the registered content may include determining content to be provided to the second device, based on the user information of the first device and the user information of the second device.

The user information may include information about at least one of a sex, age, and field of interest of a user.

The registered content may be evaluated based on at least one of a number of times that the registered content is provided to another device, and the evaluation of the registered content, which is input from the device.

The content access history of the second device may include at least one of a type of content provided from the content recommendation server to the second device, a date when content is provided, a position where content is provided, weather of the position, and the evaluation of content by the second device.

According to another aspect of the present disclosure, there is provided a method of requesting registration of shared content via a device. The method includes collecting position information of the device, providing the collected position information to a server, and requesting the server to register content reproduced by the device. The content registration requesting unit provides the collected position information to the server, the reproduced content is registered to the server according to the request to register content, and the registered content is provided to another device, based on the provided position information and a content access history of the other device.

A region of the device may be determined based on the collected position information and an evaluation of content that is registered to the server, and the registered content may be provided to the other device positioned in the region, based on the determined region.

According to another aspect of the present disclosure, there is provided a method of receiving shared content via a device. The method includes providing position information of the device to a server, and receiving content corresponding to the position from the server. The receiving of the content includes receiving content that is recommended based on the provided position information and a content access history of the device.

The method may further include providing evaluation information of the received content to the server, wherein a region of another device providing the content may be determined based on evaluation of the content, and the receiving of the content may include receiving content that is registered by the other device from the server when a position of the device is included in the region.

According to another aspect of the present disclosure, there is provided a computer readable recording medium having recorded thereon a program for executing the method of requesting registration of shared content.

According to another aspect of the present disclosure, there is provided a computer readable recording medium having recorded thereon a program for executing the method of receiving shared content.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 3 is a block diagram of a region determining unit according to an embodiment of the present disclosure;

FIG. 4 is a block diagram of a content recommendation unit according to an embodiment of the present disclosure;

FIG. 9 is a diagram of an example of a content registration table that is stored in a database (DB) of a content recommendation server, according to an embodiment of the present disclosure;

FIG. 10 is a diagram of an example of a user region table that is stored in a DB of a content recommendation server, according to an embodiment of the present disclosure;

FIG. 11 is a diagram of a content access history table that is stored in a DB of a content recommendation server, according to an embodiment of the present disclosure.

DETAILED DESCRIPTION OF THE INVENTION

Figure 1:
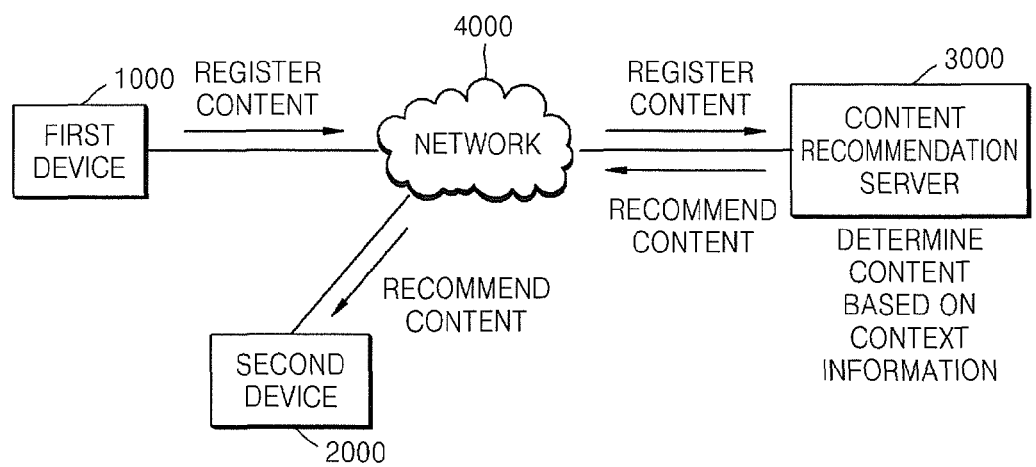
FIG. 1 is a schematic diagram of a content sharing system using context information, according to an embodiment of the present disclosure.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged content sharing system. Hereinafter, the present disclosure will now be described more fully with reference to the accompanying drawings, in which exemplary embodiments of the disclosure are shown. The disclosure may, however, be embodied in many different forms and should not be construed as being limited to the embodiments set forth herein; rather, these embodiments are provided so that this disclosure will be thorough and complete, and will fully convey the concept of the disclosure to those of ordinary skill in the art. In the following description, well-known functions or constructions are not described in detail so as not to obscure the disclosure with unnecessary detail. Also, throughout the specification, like reference numerals in the drawings denote like elements.

Throughout the specification, it will also be understood that when an element is referred to as being "connected to" another element, it can be directly connected to the other element, or electrically connected to the other element while intervening elements may also be present. Also, when a part "includes" or "comprises" an element, unless there is a particular description contrary thereto, the part can further include other elements, not excluding the other elements.

Throughout the specification, the term "context information" refers to situation information related to content, and for example, may include, but is not limited to, information about a device, a user, a position, weather, or an evaluation that is related to contents. Expressions such as "at least one of," when preceding a list of elements, modify the entire list of elements and do not modify the individual elements of the list.

Hereinafter, the present disclosure will be described with reference to the accompanying drawings.

FIG. 1 is a schematic diagram of a content sharing system using context information, according to an embodiment of the present disclosure.

As shown in FIG. 1, the content sharing system using context information according to the present embodiment includes a first device 1000, a second device 2000, a content recommendation server 3000, and a network 4000.

In the content sharing system according to the present embodiment, the first device 1000 registers content to the content recommendation server 3000 and the second device 2000 receives recommendation content from the content recommendation server 3000.

The first device 1000 may request the content recommendation server 3000 to register content. The content recommendation server 3000 may register the content requested to be registered together with context information upon receiving the request to register the content.

In addition, the content recommendation server 3000 may receive a request to provide content and position information of the second device 2000 from the second device 2000 and may recommend content to the second device 2000 according to the position of the second device 2000 and a content access history of the second device 2000. In this situation, the content recommended to the second device 2000 may be determined based on context information that is collected by the content recommendation server 3000.

In this situation, the content recommended to the second device 2000 may be determined according to whether the second device 2000 is positioned in a region corresponding to the first device 1000. The region corresponding to the first device 1000 may be determined according to an evaluation of the content registered by the first device 1000.

Throughout the specification, for convenience of description, the situation where the first device 1000 makes a request for registration of content and the second device 2000 receives recommendation content is described. However, the present disclosure is not limited thereto. That is, the second device 2000 may make a request for registration of content and the first device 1000 may receive recommendation content. In addition, throughout the specification, a situation where two devices share content has been described. However, the present disclosure is not limited thereto. That is, two or more devices may share content with each other. Thus, a plurality of devices may make a request for registration of content and a plurality of devices may receive recommendation content.

Hereinafter, the detailed configuration of the content recommendation server 3000 will be described with reference to FIG. 2.

Figure 2:
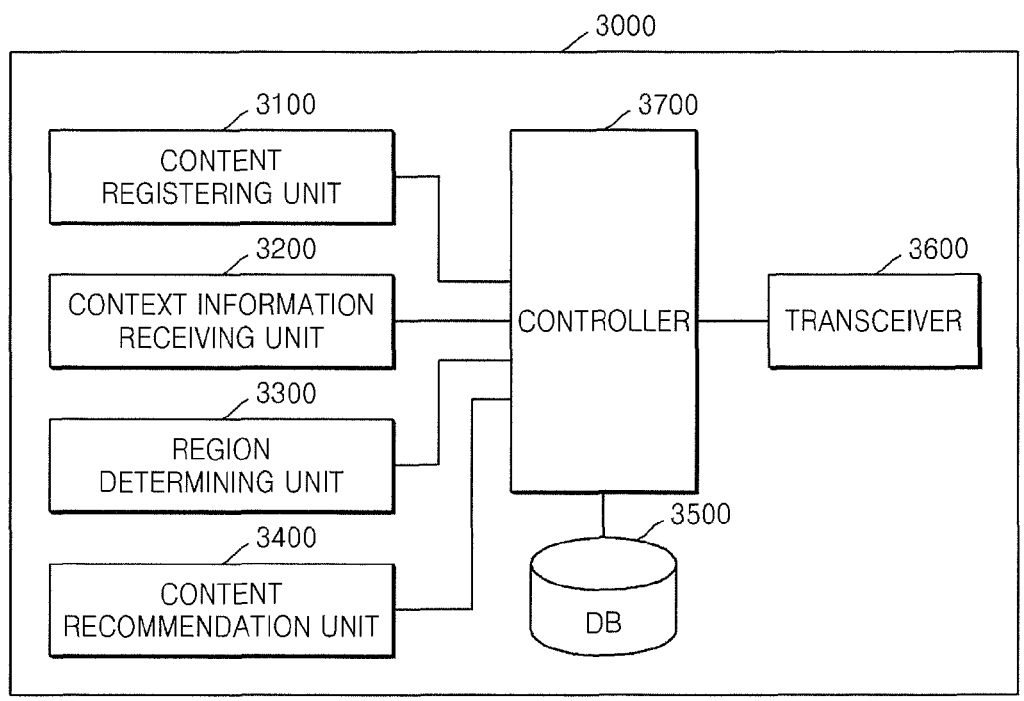
FIG. 2 is a block diagram of a content recommendation server according to an embodiment of the present disclosure.

FIG. 2 is a block diagram of the content recommendation server 3000 according to an embodiment of the present disclosure.

Referring to FIG. 2, the content recommendation server 3000 includes a content registering unit 3100, a context information receiving unit 3200, a region determining unit 3300, a content recommendation unit 3400, a DB 3500, a transceiver 3600, and a controller 3700.

The context information receiving unit 3200 receives context information from the first device 1000. The context information receiving unit 3200 may receive from the first device 1000 an identification value of the first device 1000, position information of the first device 1000, and information about a date, time, and weather when a request to register content is transmitted from the first device 1000.

In addition, the context information receiving unit 3200 may receive context information from a separate server (not shown). The context information receiving unit 3200 may receive from a separate server (not shown) the information about the date, time, and weather when a request to register content is transmitted from the first device 1000. Furthermore, the context information receiving unit 3200 may receive user information of a user of the first device 1000 from a server (not shown), based on the identification value of the first device 1000. In this situation, the context information receiving unit 3200 may receive information about, for example, an age, sex, and taste of a user. In addition, the context information receiving unit 3200 may receive user information of the second device 2000 from the second device 2000 or a separate server (not shown). User information includes information about, for example, an age, sex, and taste of a user.

The content registering unit 3100 receives a request to register content from the first device 1000 and register the content requested to be registered. The content registering unit 3100 may receive an identification value of the content requested to be registered from the first device 1000 and may register content corresponding to the identification value to a database (DB) 3500, which will be described later. In addition, the content registering unit 3100 may receive content from the first device 1000 and may register the received content to the DB 3500.

In addition, the content registering unit 3100 may register the content requested to be registered, together with the context information received by the context information receiving unit 3200. For example, the content registering unit 3100 may register the content to the DB 3500 together with the identification value and position information of the first device 1000, a date, time, and weather when a request to register content is transmitted, and the identification value of the content. The content registered by the content registering unit 3100 will be described in more detail with reference to FIG. 7.

The region determining unit 3300 determines a region corresponding to the first device 1000. The region determining unit 3300 may determine the region corresponding to the first device 1000, according to the number of times that registered content is provided to the second device 2000 and an evaluation of the registered content. The region determining unit 3300 may determine a reference position based on a position of the first device 1000 that makes a request for registration of content and may determine the size of the region corresponding to the first device 1000 based on the determined reference position. A configuration of the region determining unit 3300 that determines the region corresponding to the first device 1000 will be described in detail with reference to FIG. 3.

The content recommendation unit 3400 provides recommendation content to the second device 2000. The content recommendation unit 3400 may receive position information from the second device 2000 and may recommend content corresponding to the received position information to the second device 2000. The content recommendation unit 3400 may confirm a region corresponding to a position of the second device 2000 and may provide to the second device 2000 the content to be requested to be registered, in the confirmed region.

The content recommendation unit 3400 may collect a content access history of the second device 2000, may compare the content access history of the second device 2000 with context information received by the context information receiving unit 3200, and may determine recommendation content.

The detailed configuration of the content recommendation unit 3400 will be described in more detail with reference to FIG. 4.

The DB 3500 stores a variety of information for recommending content by the content recommendation server 3000. The DB 3500 may store, for example, information about content registration, context information about content, information about a content access history, and information about a region corresponding to the first device 1000.

The transceiver 3600 may transmit and receive a variety of information, which is associated with the content recommendation server 3000 to recommend content, to and from the first device 1000, the second device 2000, and a separate server (not shown).

The controller 3700 controls an overall operation of the content recommendation server 3000 and controls the content registering unit 3100, the context information receiving unit 3200, the region determining unit 3300, the content recommendation unit 3400, the DB 3500, and the transceiver 3600 such that the content recommendation server 3000 may register content that is requested to be registered by the first device 1000 and may recommend the registered content to the second device 2000.

Hereinafter, a configuration of the region determining unit 3300 will be described in detail with reference to FIG. 3.

FIG. 3 is a block diagram of a region determining unit 3300 according to an embodiment of the present disclosure.

As shown in FIG. 3, the region determining unit 3300 includes a content recommendation number obtaining unit 3310, a content evaluation unit 3320, a reference position determining unit 3330, a region size determining unit 3340, and a representative uploader determining unit 3350.

The content recommendation number obtaining unit 3310 obtains the number of times that respective content is recommended to the second device 2000. The content recommendation number obtaining unit 3310 may count the number of times that content registered by the first device 1000 is recommended to another device. In addition, the content recommendation number obtaining unit 3310 may count the number of times that content registered by a device is recommended for each respective position.

The content evaluation unit 3320 may receive a user evaluation of the registered content. The content evaluation unit 3320 may receive evaluation information of content from the second device 2000 to which the registered content is recommended and may calculate an evaluation grade of content based on the received evaluation information.

The reference position determining unit 3330 determines a reference position for determining a region of the first device 1000. The reference position determining unit 3330 may determine at least one of a well-known place and landmark of a predetermined region as the reference position but the present disclosure is not limited thereto. In addition, the reference position determining unit 3330 may determine a reference position with respect to a region corresponding to content that is requested to be registered a predetermined number of times or more. For example, the reference position determining unit 3330 may determine a reference position in the vicinity of Gwanghwamun when content requested to be registered is transmitted a predetermined number of times or more in the vicinity of Gwanghwamun. Alternatively, the reference position determining unit 3330 may determine a global positioning system (GPS) value corresponding to a region where Gwanghwamun is positioned, as a reference position value. In addition, the reference position determining unit 3330 may determine a landmark within a predetermined range as a reference position from a position where the first device 1000 makes a request for registration of content.

The region size determining unit 3340 may determine a region of the first device 1000 according to the number of times that respective content is recommended and the evaluation grade of content. The region determining unit 3300 may determine the region of the first device 1000 according to the number of times that content that is requested to be registered by the first device 1000 is recommended and the evaluation on content from another device, which is requested to be registered by the first device 1000. For example, when content that is requested to be registered by the first device 1000 is recommended to another device 15 times in the vicinity of Gwanghwamun and an evaluation grade from another device is 10 points, the region corresponding to the first device 1000 may be determined as a region within a radius of 500 m from Gwanghwamun according to the number of times the content is recommended (i.e., 15 times) and the evaluation grade. Thus, a user of the first device 1000 may actively make a request for registration of content via the first device 1000 in order to expand the region of the first device 1000.

The representative uploader determining unit 3350 determines a representative uploader of a reference position. The representative uploader determining unit 3350 may determine the representative uploader based on a size of a region corresponding to a device. For example, a device to which a region has a greatest size may be determined as a representative uploader. In addition, the representative uploader determining unit 3350 may determine a plurality of devices having a size that is equal to or greater than a predetermined size as the representative uploader from among devices that register content within a predetermined distance from the reference position.

In addition, only content that is requested to be registered from the device determined as the representative uploader may be recommended to the second device 2000, thereby effectively allowing the first device 1000 to request to register content.

Hereinafter, a configuration of the content recommendation unit 3400 will be described in detail with reference to FIG. 4.

FIG. 4 is a block diagram of a content recommendation unit 3400 according to an embodiment of the present disclosure.

As shown in FIG. 4, the content recommendation unit 3400 includes a content access history collecting unit 3410, a recommendation content determining unit 3420, and a content providing unit 3430.

The content access history collecting unit 3410 collects a content access history of the second device 2000. The content access history collecting unit 3410 may collect information about at least one of an identification value of content provided to the second device 2000, a type of content provided to the second device 2000, a position where the second device 2000 receives the content, and a date, time, and weather when the second device 2000 receives the content. For example, the content access history collecting unit 3410 may store information indicating that content provided to the second device 2000 is a music file, a genre of music is a ballad, content is provided at six o'clock on Nov. 1, 2011, and the weather when the content was provided was fine.

The recommendation content determining unit 3420 determines content to be recommended to the second device 2000, based on the collected content access history. The recommendation content determining unit 3420 may compare context information about content with the content access history of the second device 2000 and may determine the content to be recommended to the second device 2000. The recommendation content determining unit 3420 may determine, for example, a genre of content similar to content that is provided by a user of the second device 2000 in the current position as the recommendation content.

In addition, for example, the recommendation content determining unit 3420 may determine content that is registered for a season and weather similar to the current season and weather as the recommendation content. For example, the recommendation content determining unit 3420 may determine content that is registered at a time similar to the current time as the recommendation content.

The recommendation content determining unit 3420 may determine the recommendation content based on user information of the first device 1000 and user information of the second device 2000. The recommendation content determining unit 3420 may determine content that is registered by a device of a user having a similar age and sex to a user of the second device 2000 as the recommendation content.

In addition, the recommendation content determining unit 3420 may determine a similar type of content to content that is evaluated as a predetermined grade or more as the recommendation content, based on an evaluation grade of content, which is given by the second device 2000.

The content providing unit 3430 provides the recommendation content to the second device 2000. The content providing unit 3430 may provide a list of the recommendation content to the second device 2000 and may provide content that is selected by the second device 2000 to the second device 2000.

Hereinafter, a configuration of the first device 1000 will be described in detail with reference to FIG. 5.

Figure 5:
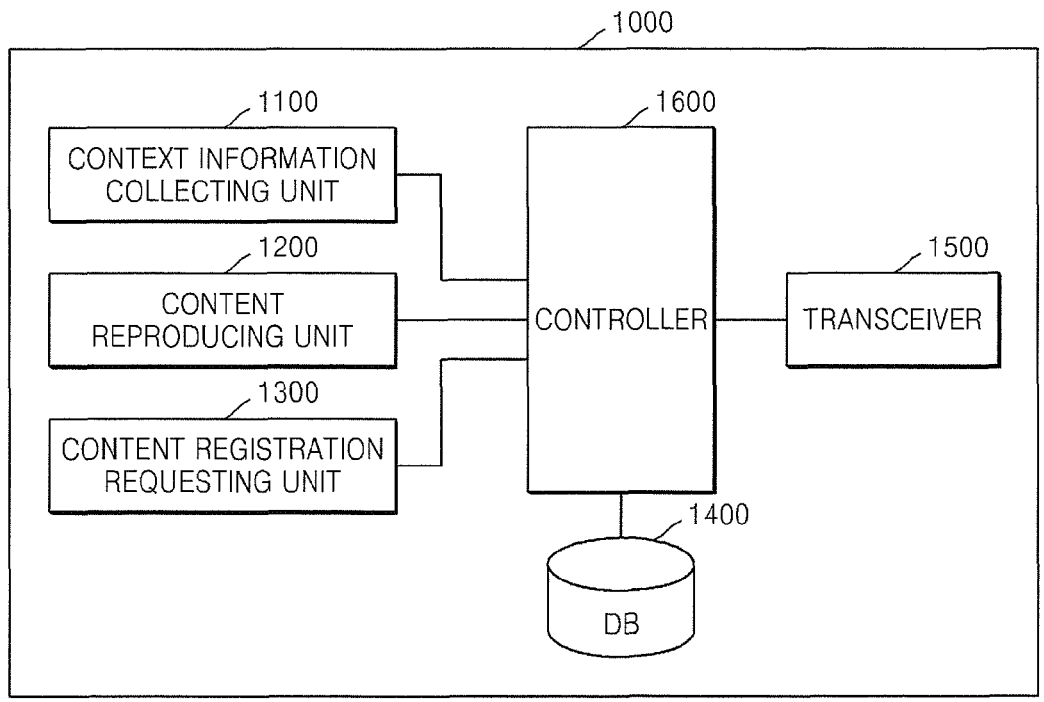
FIG. 5 is a block diagram of a first device according to an embodiment of the present disclosure.

FIG. 5 is a block diagram of the first device 1000 according to an embodiment of the present disclosure.

As shown in FIG. 5, the first device 1000 includes a context information collecting unit 1100, a content reproducing unit 1200, a content registration requesting unit 1300, a DB 1400, a transceiver 1500, and a controller 1600.

The context information collecting unit 1100 collects context information related to content requested to be registered. The context information collecting unit 1100 may collect position information of a place where content is requested to be registered and information about a date, time, and weather where content is requested to be registered, but the present disclosure is not limited thereto.

The content reproducing unit 1200 reproduces content that is selected by the first device 1000. The content that is reproduced by the content reproducing unit 1200 may be content that is stored in the first device 1000 but the present disclosure is not limited thereto. For example, the reproduced content may be content provided from a separate server (not shown).

The content registration requesting unit 1300 requests the content recommendation server 3000 to register content. The content registration requesting unit 1300 may provide the content requested to be registered to the content recommendation server 3000 but the present disclosure is not limited thereto. Alternatively, the content registration requesting unit 1300 may provide an identification value of the content requested to be registered to the content recommendation server 3000.

In addition, when the content registration requesting unit 1300 makes a request for registration of content, the content registration requesting unit 1300 may provide context information that is collected by the context information collecting unit 1100 to the content recommendation server 3000. When the content registration requesting unit 1300 makes a request for registration of content, the content registration requesting unit 1300 may provide an identification value of the first device 1000 and user information of the first device 1000 to the content recommendation server 3000.

The DB 1400 may store a variety of information for requesting the content recommendation server 3000 to register content, wherein the requesting is performed by the first device 1000. The DB 1400 may store, for example, context information about content, the user information of the first device 1000, and the identification value of the first device 1000.

The transceiver 1500 transmits and receives a variety of information to and from the second device 2000, the content recommendation server 3000, and a separate server (not shown) such that the first device 1000 may request the content recommendation server 3000 to register content.

The controller 1600 controls an overall operation of the first device 1000 and controls the context information collecting unit 1100, the content reproducing unit 1200, the content registration requesting unit 1300, the DB 1400, and the transceiver 1500 such that the first device 1000 may request the content recommendation server 3000 to register content.

Hereinafter, the detailed configuration of the second device 2000 will be described with reference to FIG. 6.

Figure 6:
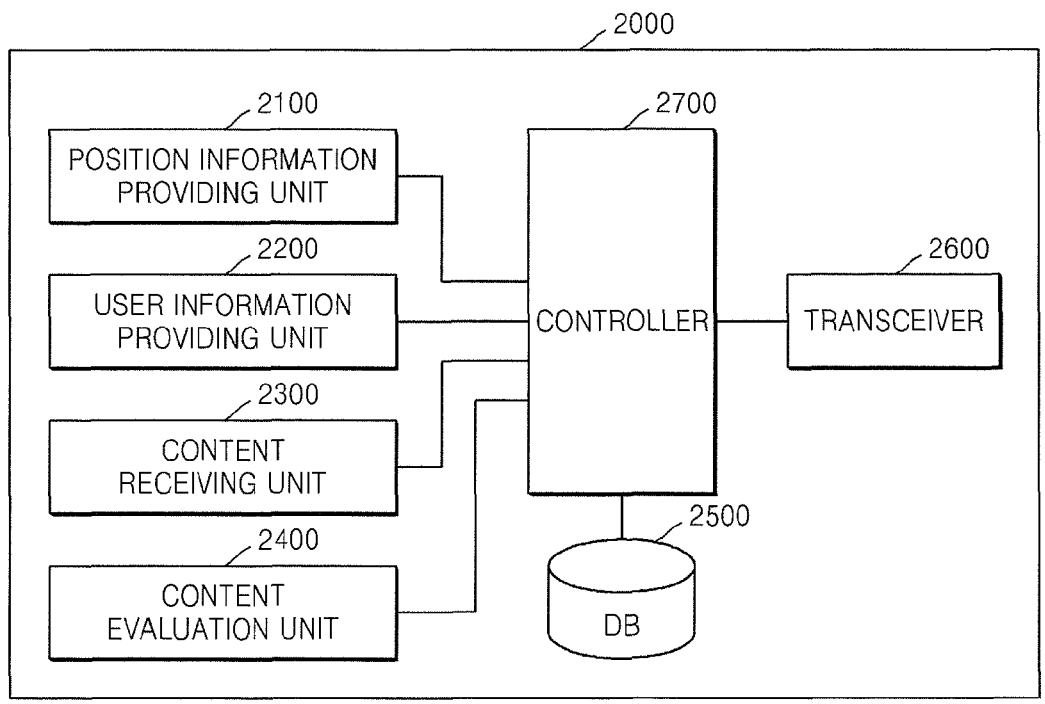
FIG. 6 is a block diagram of a second device according to an embodiment of the present disclosure.

FIG. 6 is a block diagram of a second device 2000 according to an embodiment of the present disclosure.

As shown in FIG. 6, the second device 2000 includes a position information providing unit 2100, a user information providing unit 2200, a content receiving unit 2300, a content evaluation unit 2400, a DB 2500, a transceiver 2600, and a controller 2700.

The position information providing unit 2100 provides position information of the second device 2000 to the content recommendation server 3000. The position information providing unit 2100 may provide to the content recommendation server 3000 the position information of the second device 2000 when the second device 2000 requests registration of content. The position information includes, but is not limited to, a name of a landmark, a name of a well-known place, and a GPS value of a predetermined position.

The user information providing unit 2200 provides user information of the second device 2000 to the content recommendation server 3000. The user information providing unit 2200 may provide, for example, an identification value of the second device 2000, an identification value of a user of the second device 2000, and an age, sex, a field of interest, and taste of the user of the second device 2000 to the content recommendation server 3000 but the present disclosure is not limited thereto.

The content receiving unit 2300 receives recommendation content from the content recommendation server 3000. The content receiving unit 2300 may receive content that is selected from a list of recommendation content, which is provided from the content recommendation server 3000.

The content evaluation unit 2400 provides evaluation information about the received content to the content recommendation server 3000. For example, the content evaluation unit 2400 may provide an evaluation grade of the received content to the content recommendation server 3000, based on a user's input but the present disclosure is not limited thereto. A user interface for evaluating content may be provided to the second device 2000. The content evaluation unit 2400 may evaluate content about various items, based on a user's input through the user interface.

The DB 2500 stores a variety of information for receiving the recommendation content to enable the second device 2000 to evaluate the recommendation content.

The transceiver 2600 may transmit and receive a variety of information for receiving the recommendation content to enable the second device 2000 to evaluate the recommendation content, to and from the first device 1000, the content recommendation server 3000, and a separate server (not shown).

The controller 2700 controls an overall operation of the second device 2000 and controls the position information providing unit 2100, the user information providing unit 2200, the content receiving unit 2300, the content evaluation unit 2400, the DB 2500, and the transceiver 2600 such that the second device 2000 may receive and evaluate the recommendation content.

Hereinafter, a method of sharing content by using context information will be described with reference to FIG. 7.

Figure 7:
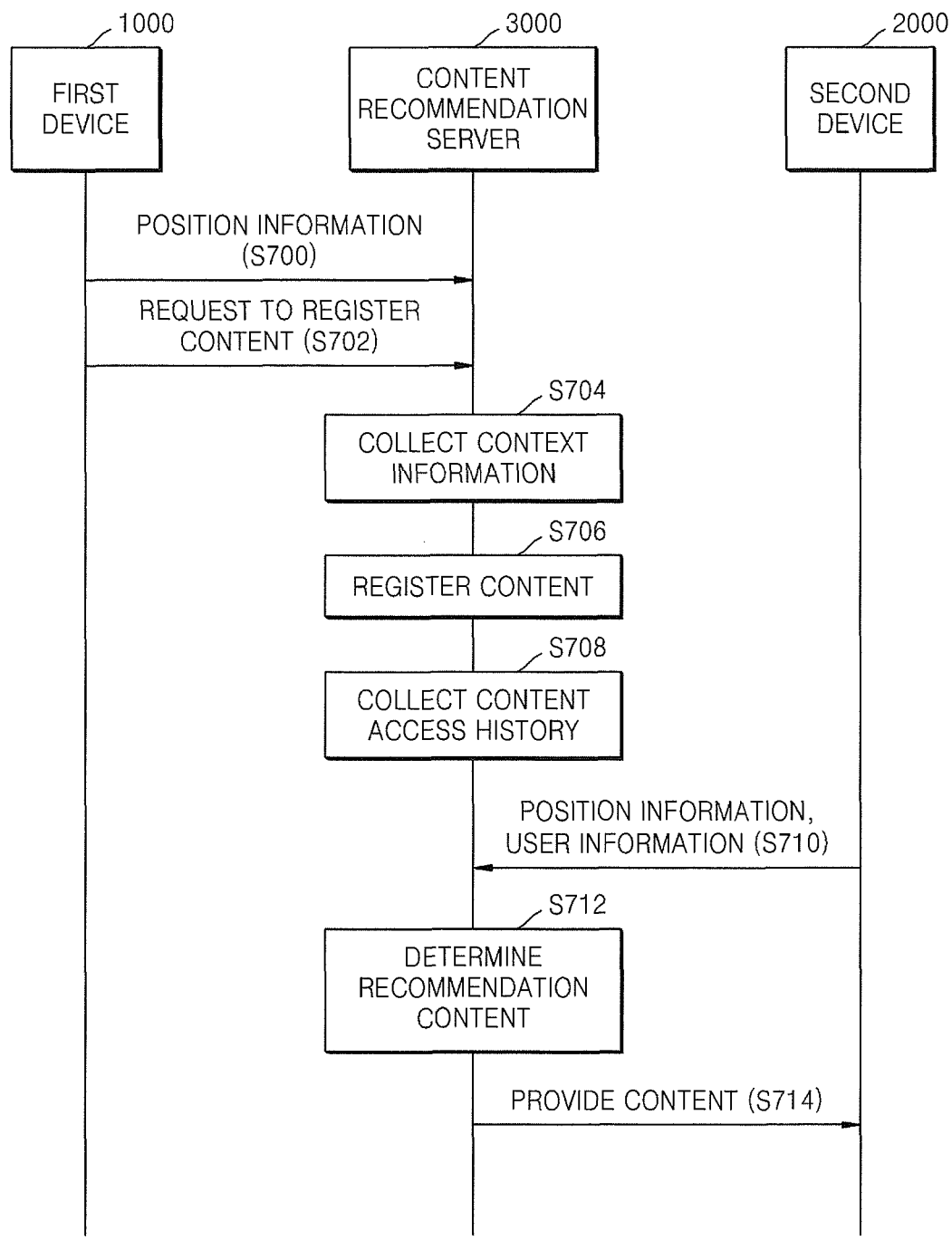
FIG. 7 is a flowchart of a method of sharing content by using context information, according to an embodiment of the present disclosure.

FIG. 7 is a flowchart of a method of sharing content by using context information, according to an embodiment of the present disclosure.

In operation S700, the first device 1000 provides position information and user information to the content recommendation server 3000. In operation S700, the first device 1000 may provide a GPS value of a place when the first device 1000 is positioned to the content recommendation server 3000. The first device 1000 may provide information about at least one of an identification value of the first device 1000, an identification value of a user of the first device 1000, and an age, sex, and taste of a user of the first device 1000 to the content recommendation server 3000.

In operation S702, the first device 1000 requests the content recommendation server 3000 to register content. In operation S702, the first device 1000 may provide the content requested to be registered to the content recommendation server 3000 but the present disclosure is not limited thereto. An identification value of the content requested to be registered may be provided to the content recommendation server 3000.

In operation S704, the content recommendation server 3000 collects context information about the content requested to be registered. In operation S704, the content recommendation server 3000 may receive the context information about the content requested to be registered from at least one of the first device 1000 and a separate server (not shown). For example, the content recommendation server 3000 may collect information about a date, time, and weather when a request to register content is transmitted from the first device 1000. In addition, the content recommendation server 3000 may collect information about, for example, an age, sex, and taste of a user of the first device 1000.

In operation S706, the content recommendation server 3000 registers content. In operation S706, the content recommendation server 3000 may register the content requested to be registered, together with context information to the DB 3500 in response to the request to register content from the first device 1000. For example, the content recommendation server 3000 may register an identification value and position information of the first device 1000, a date, time, and weather when the content is requested to be registered, and an identification value of the content to the DB 3500.

In operation S708, the content recommendation server 3000 collects a content access history. In operation S708, the content recommendation server 3000 may collect information about at least one of an identification value of content provided to the second device 2000, a type of content provided to the second device 2000, a position where content is provided to the second device 2000, and a date, time, and weather where content is provided. For example, the content recommendation server 3000 may store information indicating that content provided to the second device 200 is a music file, a genre of music is a ballad, the content is provided at six o'clock on Nov. 1, 2011, and the weather when the content was provided was fine.

In operation S710, the second device 2000 provides position information of the second device 2000 to the content recommendation server 3000. In operation S710, the second device 2000 may provide the position information of the second device 2000 when the second device 2000 requests registration of content to the content recommendation server 3000. The position information includes, but is not limited to, a name of a landmark, a name of a well-known place, and a GPS value of a predetermined position.

In operation S712, the content recommendation server 3000 determines recommendation content. In operation S712, the content recommendation server 3000 may determine content to be recommended to the second device 2000, based on the collected content access history. In addition, the content recommendation server 3000 may compare context information about content with the content access history of the second device 2000 and may determine the content to be recommended to the second device 2000. The content recommendation server 3000 may determine, for example, a genre of content similar to content that is provided by a user of the second device 2000 in the current position as the recommendation content.

In addition, the content recommendation server 3000 may determine content that is registered for a season and weather similar to the current season and weather as the recommendation content. For example, the recommendation content determining unit 3420 may determine content that is registered at a time similar to the current time as the recommendation content.

In operation S712, the content recommendation server 3000 may determine the recommendation content based on user information of the first device 1000 and user information of the second device 2000. The content recommendation server 3000 may determine content that is registered by a device of a user whose age and sex is similar to a user of the second device 2000 as the recommendation content.

In operation S712, the content recommendation server 3000 may determine a type of content similar to content that is evaluated as a predetermined grade or more as the recommendation content, based on an evaluation grade of content, which is given by the second device 2000.

In operation S714, the content recommendation server 3000 provides the recommendation content to the second device 2000. In operation S714, the content recommendation server 3000 may provide a list of the recommendation content to the second device 2000 and may provide content that is selected by the second device 2000 to the second device 2000.

Hereinafter, a method of providing content to the second device 2000 based on a region corresponding to the first device 1000 will be described with reference to FIG. 8.

Figure 8:
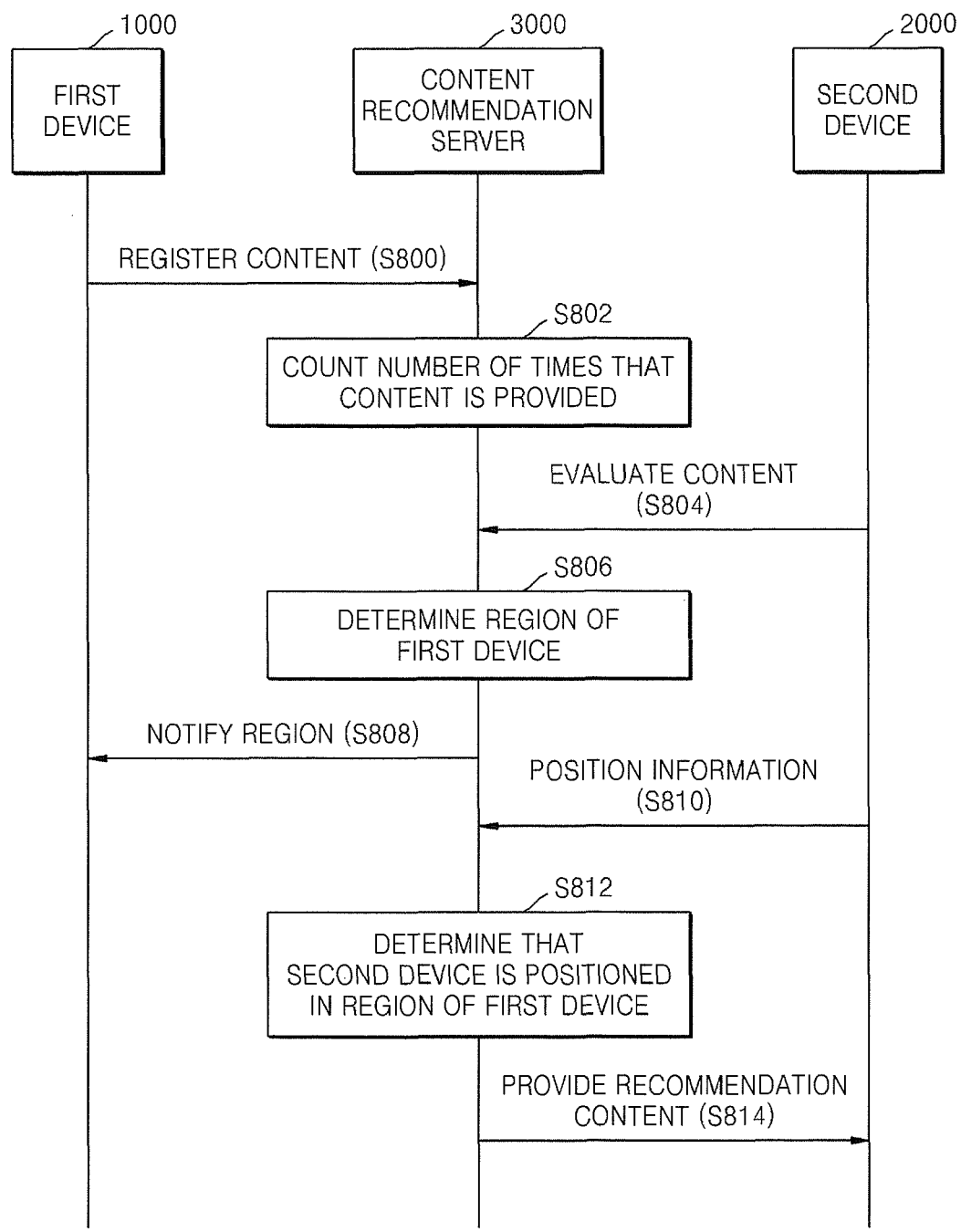
FIG. 8 is a flowchart of a method of providing content to a second device based on a region corresponding to a first device, according to an embodiment of the present disclosure.

FIG. 8 is a flowchart of a method of providing content to the second device 2000 based on a region corresponding to the first device 1000, according to an embodiment of the present disclosure.

In operation S800, the first device 1000 requests the content recommendation server 3000 to register content. In operation S800, the first device 1000 may provide the content requested to be registered to the content recommendation server 3000, but the present disclosure is not limited thereto. Alternatively, the first device 1000 may provide an identification value of the content requested to be registered to the content recommendation server 3000.

In operation S800, when the first device 1000 makes a request for registration of content, the first device 1000 may provide context information about the content to the content recommendation server 3000. When the first device 1000 requests registration of content, the first device 1000 may also provide an identification value of the first device 1000 and user information of the first device 1000 to the content recommendation server 3000. In operation S800, the content requested to be registered may be registered to the DB 3500 by the content recommendation server 3000.

In operation S802, the content recommendation server 3000 counts the number of times that content is provided. In operation S802, the content recommendation server 3000 may count the number of times that content registered by the first device 1000 is recommended to another device. In addition, the content recommendation server 3000 may count the number of times that content registered by a device is recommended for each respective position.

In operation S804, the content recommendation server 3000 receives a user evaluation of the registered content from the second device 2000. In operation S804, the content recommendation server 3000 may receive evaluation information of content from the second device 2000 to which the registered content is recommended and may calculate an evaluation grade of content based on the received evaluation information.

In operation S806, the content recommendation server 3000 determines a region of the first device 1000. In operation S806, the content recommendation server 3000 determines a reference position for determining the region of the first device 1000. The content recommendation server 3000 may determine a well-known place or landmark of a predetermined region as the reference position, but the present disclosure is not limited thereto. In addition, the content recommendation server 3000 may determine a reference position with respect to a region corresponding to content that is requested to be registered a predetermined number of times or more. For example, the content recommendation server 3000 may determine a reference position in the vicinity of Gwanghwamun when content requested to be registered is transmitted a predetermined number of times or more in the vicinity of Gwanghwamun. In addition, the content recommendation server 3000 may determine a global positioning system (GPS) value corresponding to a region where Gwanghwamun is positioned, as a reference position value.

In operation S806, the content recommendation server 3000 may determine a region of the first device 1000 according to the number of times that respective content is recommended and the evaluation grade of content. The content recommendation server 3000 may determine the region of the first device 1000 according to the number of times that content that is requested to be registered by the first device 1000 and the evaluation of content from another device, which is requested to be registered by the first device

1000. For example, when the content that is requested to be registered by the first device 1000 is recommended to another device 15 times in the vicinity of Gwanghwamun and an evaluation grade from another device is 10 points, the region corresponding to the first device 1000 may be determined as a region within a radius of 500 m from Gwanghwamun according to the number of times the content is recommended (i.e., 15 times) and the evaluation grade.

In operation S808, the content recommendation server 3000 notifies the first device 1000 about the determined region. Thus, a user of the first device 1000 may actively make a request for registration of content via the first device 1000 in order to expand the region of the first device 1000.

In operation S810, the second device 2000 provides position information of the second device 2000 to the content recommendation server 3000. In operation S810, the second device 2000 may provide to the content recommendation server 3000 the position information of the second device 2000 when the second device 2000 requests registration of content. The position information includes, but is not limited to, a name of a landmark, a name of a well-known place, and a GPS value of a predetermined position.

In operation S812, the content recommendation server 3000 determines whether the second device 2000 is positioned in the region of the first device 1000. In operation S812, the content recommendation server 3000 may determine whether the second device 2000 is positioned in the region of the first device 1000 according to the position information of the second device 2000.

In operation S814, the content recommendation server 3000 provides the recommendation content to the second device 2000 that is positioned in the region of the first device 1000. In operation S814, the content recommendation server 3000 may provide a list of recommendation content to the second device 2000 and may provide content that is selected by the second device 2000 to the second device 2000.

Hereinafter, an example of a content registration table that is stored in the DB 3500 of the content recommendation server 3000 will be described with reference to FIG. 9.

FIG. 9 is a diagram of an example of a content registration table that is stored in the DB 3500 of the content recommendation server 3000, according to an embodiment of the present disclosure.

As shown in FIG. 9, the content registration table according to the present embodiment includes a user field 70, a content field 71, a genre field 72, a position field 73, a date field 74, a time field 75, a weather field 76, a providing number field 77, and an evaluation field 78.

At least one of an identification value of a user of the first device 1000 and an identification value of the first device 1000 may be recorded in the user field 70. An identification value of content registered from the first device 1000 may be recorded in the content field 71. A type of the registered content may be recorded in the genre field 72. In addition, a position value of the first device 1000 that makes a request for registration of content may be recorded in the position field 73. Information about a date and time when a request for registration of content is transmitted may be recorded in the date field 74 and the time field 75, respectively. The weather when content is requested to be registered in a place where content is requested to be registered may be recorded in the weather field 76. The number of times that content is provided to the second device 2000 may be recorded in the providing number field 77. An evaluation grade of content may be recorded in the evaluation field 78. The evaluation grade of content may be calculated according to various algorithms based on an evaluation from the second device 2000.

Thus, a variety of context information about registered content may be recorded in the content registration table according to the present embodiment. In addition, content to be recommended to the second device 2000 may be determined based on the context information.

Hereinafter, an example of a user region table that is stored in the DB 3500 of the content recommendation server 3000 will be described with reference to FIG. 10.

FIG. 10 is a diagram of an example of a user region table that is stored in the DB 3500 of the content recommendation server 3000, according to an embodiment of the present disclosure.

As shown in FIG. 10, the user region table according to the present embodiment includes a user field 80, a reference position field 81, a region size field 82, and a content field 83.

At least one of an identification value of a user of the first device 1000 and an identification value of the first device 1000 may be recorded in the user field 80. A reference position corresponding to the first device 1000 may be recorded in the reference position field 81. For example, a name of a well-known place such as 'Gwanghwamun' may be recorded in the reference position field 81, but the present disclosure is not limited thereto. Alternatively, a GPS coordinate value of the well-known place may be recorded. In addition, a value of the size of a region corresponding to the first device 1000 may be recorded in the region size field 82. For example, a length value of a radius may be recorded in the region size field 82. In addition, an identification value of content requested to be registered from the first device 1000 in the region corresponding to the first device 1000 may be recorded in the content field 83.

Hereinafter, an example of a content access history table that is stored in the DB 3500 of the content recommendation server 3000 will be described with reference to FIG. 11.

FIG. 11 is a diagram of a content access history table that is stored in the DB 3500 of the content recommendation server 3000, according to an embodiment of the present disclosure.

As shown in FIG. 11, the content access history table according to the present embodiment includes a user field 90, a position field 91, a content field 92, a genre field 93, a date field 94, a time field 95, a weather field 96, and an evaluation field 97.

At least one of an identification value of a user of the second device 2000 and an identification value of the second device 2000 may be recorded in the user field 90. A position value of a place where content is provided to the second device 2000 may be recorded in the position field 91. An identification value of content provided to the second device 2000 may be recorded in the content field 92. A type of content provided to the second device 2000 may be recorded in the genre field 93. Information about a date and time when content is provided to the second device 2000 may be recorded in the date field 94 and the time field 95, respectively. The weather when the content is provided in a place where content is provided to the second device 2000 may be recorded in the weather field 96. An evaluation grade of the content, which is given by the second device 2000, may be recorded in the evaluation field 97. Thus, the content recommendation server 3000 may determine recommendation content according to the current position of the second device 2000 and the content access history of the second device 2000, based on the content registration table and the content access history table and may provide the determined recommendation content to the second device 2000.

Hereinafter, a region that is determined with respect to the first device 1000 will be described with reference to FIG. 12.

Figure 12:
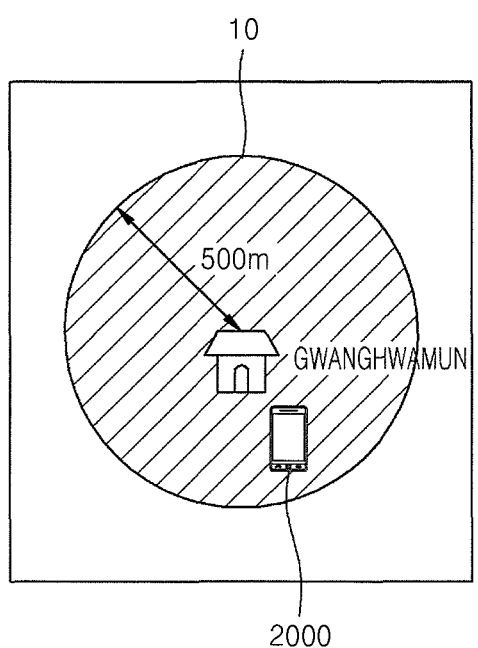
FIG. 12 is a diagram of a region that is determined with respect to a first device, according to an embodiment of the present disclosure.

FIG. 12 is a diagram of an example of a region that is determined with respect to the first device 1000, according to an embodiment of the present disclosure.

As shown in FIG. 12, a region 10 of the first device 1000 may be positioned within a radius of 500 m from 'Gwanghwamun' as a reference position and the second device 2000 may be positioned in the region 10 of the first device 1000. In this situation, the content recommendation server 3000 may receive position information from the second device 2000 and may determine that the second device 2000 is positioned in the region 10 of the first device 1000. In addition, the content recommendation server 3000 may receive an identification value of the second device 2000 from the second device 2000 and may confirm a content access history of the second device 2000. The content recommendation server 3000 may compare the content access history of the second device 2000 with context information of registered content from the first device 1000 and may provide recommendation content to the second device 2000.

According to the one or more embodiments of the present disclosure, content may be effectively shared by devices by using context information.

In addition, registered content may be effectively recommended based on a position and content access history of a device.

Moreover, content may be recommended to a device positioned in a region corresponding to another device, based on the region, thereby effectively allowing the device to request to register content.

The one or more embodiments of the present disclosure may be embodied as a recording medium, e.g., a program module to be executed in computers, which include computer-readable commands. The computer storage medium may include any usable medium that may be accessed by computers, volatile and non-volatile media, and detachable and non-detachable media. Also, the computer storage medium may include a computer storage medium and a communication medium. The computer storage medium includes all of volatile and non-volatile media, and detachable and non-detachable media which are designed to store information including computer readable commands, data structures, program modules or other data. The communication medium includes computer-readable commands, a data structure, a program module, and other transmission mechanisms, and includes other information transmission media.

The present disclosure may, however, be embodied in many different forms and should not be construed as being limited to the embodiments set forth herein; rather, these embodiments are provided so that this disclosure will be thorough and complete, and will fully convey the inventive concept to those of ordinary skill in the art.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A content recommendation server configured to recommend content to a device, the content recommendation server comprising:

a transceiver configured to receive, from a first device, position information of the first device; and a controller configured to:

receive a request to register content from the first device and register the content with the received position information, and recommend the registered content to a second device as a function of the received position information and a content access history of the second device in response to determining that the second device is within a region associated with the received position information of the first device, wherein the region is allocated to the first device and a size of the region is determined based on a number of times that the registered content is provided to another device, and wherein the size of the region is changeable based on the number of times that the registered content is provided to the other device.

2. The content recommendation server of claim 1, wherein the controller is configured to determine the region corresponding to the first device based on an evaluation of the registered content and provide the registered content to the second device when the second device is positioned within the determined region corresponding to the first device.

3. The content recommendation server of claim 2, wherein the controller is configured to determine the region corresponding to the first device based on the received position information.

4. The content recommendation server of claim 2, wherein the controller is configured to determine the region corresponding to the first device based on a landmark within a predetermined range from a position where the first device requests registration of the content.

5. The content recommendation server of claim 2, wherein the controller is configured to determine a size of the region corresponding to the first device based on the evaluation of the registered content.

6. The content recommendation server of claim 1, wherein the controller is configured to determine content to be recommended to the second device based on information about at least one of a time and date when the content is registered and a weather condition of a place where the first device providing the content is positioned.

7. The content recommendation server of claim 1, wherein the transceiver is configured to receive user information of the first device and user information of the second device, and wherein the controller is configured to determine content to be provided to the second device based on the user information of the first device and the user information of the second device.

8. The content recommendation server of claim 7, wherein the user information comprises information about at least one of a sex, an age or a field of interest of a user.

9. The content recommendation server of claim 2, wherein the registered content is evaluated based on at least one of a number of times that the registered content is provided to another device or the evaluation of the registered content which is input that is received from the second device.

10. The content recommendation server of claim 1, wherein the controller is configured to receive an identification value of content from the first device and register content corresponding to the identification value.

11. The content recommendation server of claim 1, wherein the content access history of the second device comprises at least one of a type of content provided from the content recommendation server to the second device, a date when content is provided, a position where content is provided, a weather condition at the position, and an evaluation of content by the second device.

12. A method to recommend content to a device, the method comprising:
receiving, from a first device, position information of the first device;
receiving a request to register content from the first device and registering the content with the received position information; and
recommending the registered content to a second device based on the received position information and a content access history of the second device in response to determining that the second device is within a region associated with the received position information of the first device,
wherein the region is allocated to the first device and a size of the region is determined based on based on a number of times that the registered content is provided to another device, and
wherein the size of the region is changeable based on the number of times that the registered content is provided to the other device.

13. The method of claim 12, further comprising determining the region corresponding to the first device based on an evaluation of the registered content,
wherein the recommending of the registered content comprises providing the registered content to the second device when the second device is positioned within the determined region corresponding to the first device.

14. The method of claim 13, wherein determining the region corresponding to the first device comprises determining the region corresponding to the first device based on the received position information.

15. The method of claim 13, wherein determining the region corresponding to the first device comprises determining the region corresponding to the first device based on a landmark within a predetermined range from a position where the first device requests registration of the content.

16. The method of claim 13, wherein determining the region corresponding to the first device comprises determining a size of the region corresponding to the first device based on the evaluation of the registered content.

17. The method of claim 13, wherein the registered content is evaluated based on at least one of a number of times that the registered content is provided to another device or the evaluation of the registered content which is input that is received from the second device.

18. The method of claim 12, wherein recommending the registered content comprises determining content to be recommended to the second device based on information about at least one of a time and date when the content is registered or a weather condition of a place where the first device providing the content is positioned.

19. The method of claim 12, further comprising receiving user information of the first device and user information of the second device,
wherein recommending the registered content comprises determining content to be provided to the second device based on the user information of the first device and the user information of the second device.

20. The method of claim 19, wherein the user information comprises information about at least one of a sex, an age or a field of interest of a user.

21. The method of claim 12, wherein the content access history of the second device comprises at least one of a type of content provided from a content recommendation server to the second device, a date when content is provided, a position where content is provided, a weather condition at the position, or an evaluation of content by the second device.

* * * * *